United States Patent
Chou

(10) Patent No.: US 10,120,065 B2
(45) Date of Patent: Nov. 6, 2018

(54) ANTENNA ARRAY

(71) Applicant: Wistron Corp., New Taipei (TW)

(72) Inventor: Chen Yu Chou, New Taipei (TW)

(73) Assignee: WISTRON CORP., New Taipei (TW)

( * ) Notice: Subject to any disclaimer, the term of this patent is extended or adjusted under 35 U.S.C. 154(b) by 420 days.

(21) Appl. No.: 14/947,983

(22) Filed: Nov. 20, 2015

(65) Prior Publication Data

US 2017/0016980 A1    Jan. 19, 2017

(30) Foreign Application Priority Data

Jul. 17, 2015 (TW) .............................. 104123193 A

(51) Int. Cl.
| | | |
|---|---|---|
| *G01S 7/03* | (2006.01) | |
| *G01S 7/42* | (2006.01) | |
| *H01Q 9/28* | (2006.01) | |
| *G01S 13/56* | (2006.01) | |
| *H01Q 21/28* | (2006.01) | |

(52) U.S. Cl.
CPC ................. *G01S 7/42* (2013.01); *G01S 7/03* (2013.01); *G01S 13/56* (2013.01); *H01Q 9/285* (2013.01); *H01Q 21/28* (2013.01)

(58) Field of Classification Search
CPC .......... G01S 7/42; G01S 13/56; G01S 13/885; G01S 13/887; G01S 13/888; H01Q 21/28; H01Q 21/065; H01Q 5/378; H01Q 5/385; H01Q 5/392; H01Q 5/48; H01Q 5/49; H01Q 9/285
See application file for complete search history.

(56) References Cited

U.S. PATENT DOCUMENTS

| | | | | |
|---|---|---|---|---|
| 3,587,110 A | * | 6/1971 | Woodward ............. | H01Q 9/065 333/238 |
| 3,916,349 A | * | 10/1975 | Ranghelli ................ | H01Q 3/38 333/103 |
| 4,604,628 A | * | 8/1986 | Cox ......................... | H01Q 5/49 343/722 |
| 4,833,482 A | * | 5/1989 | Trinh ................. | H01Q 21/0075 343/700 MS |

(Continued)

FOREIGN PATENT DOCUMENTS

| | | |
|---|---|---|
| CN | 102723577 A | 10/2012 |
| CN | 204166582 U | 2/2015 |
| WO | WO 2006038432 A1 | 4/2006 |

OTHER PUBLICATIONS

Taiwan Patent Office, Office Action, Patent Application Serial No. 104123193, dated Jun. 23, 2016, Taiwan.

*Primary Examiner* — Peter M Bythrow

(57) ABSTRACT

An antenna array is provided for monitoring an object. The antenna array includes an emitting antenna module, a first receiving antenna module, a second receiving antenna module and a third receiving antenna module. The emitting antenna module emits a detecting signal, wherein the detecting signal contacts the object, and is reflected by the object as a return signal. The first receiving antenna module receives the return signal. The second receiving antenna module receives the return signal. The third receiving antenna module receives the return signal, wherein any one of the antenna modules has a phase difference of 90 degrees with the nearest neighboring antenna module.

16 Claims, 4 Drawing Sheets

(56) References Cited

U.S. PATENT DOCUMENTS

| | | | | |
|---|---|---|---|---|
| 4,857,938 A * | 8/1989 | Tsukamoto | H01Q 21/0081 | 343/700 MS |
| 5,231,406 A * | 7/1993 | Sreenivas | H01Q 21/24 | 343/700 MS |
| 5,406,292 A * | 4/1995 | Schnetzer | H01Q 13/106 | 343/700 MS |
| 5,418,541 A * | 5/1995 | Schroeder | H01Q 21/0075 | 343/700 MS |
| 5,623,238 A * | 4/1997 | Takahashi | H01P 1/20381 | 333/204 |
| 5,661,494 A * | 8/1997 | Bondyopadhyay | H01Q 1/364 | 343/700 MS |
| 5,955,994 A * | 9/1999 | Staker | H01Q 21/065 | 343/700 MS |
| 6,052,098 A * | 4/2000 | Killen | H01Q 9/285 | 343/795 |
| 6,154,180 A * | 11/2000 | Padrick | H01Q 9/14 | 343/722 |
| 6,288,677 B1 * | 9/2001 | Fink | H01Q 9/0435 | 343/700 MS |
| 6,323,814 B1 * | 11/2001 | Apostolos | H01Q 1/36 | 343/741 |
| 6,552,685 B2 * | 4/2003 | Zhang | H01Q 1/526 | 343/700 MS |
| 6,717,551 B1 * | 4/2004 | Desclos | H01Q 1/241 | 343/700 MS |
| 7,075,485 B2 * | 7/2006 | Song | H01Q 1/246 | 343/700 MS |
| 7,688,273 B2 * | 3/2010 | Montgomery | H01Q 1/243 | 343/820 |
| 8,502,745 B2 * | 8/2013 | Park | H01Q 1/243 | 343/770 |
| 9,124,007 B2 * | 9/2015 | Yamagajo | H01Q 1/36 | |
| 9,391,375 B1 * | 7/2016 | Bales | H01Q 21/24 | |
| 9,882,283 B2 * | 1/2018 | Kawata | H01Q 9/26 | |
| 2003/0076254 A1 * | 4/2003 | Witten | G01S 7/28 | 342/22 |
| 2003/0085847 A1 | 5/2003 | Waltho et al. | | |
| 2005/0128144 A1 * | 6/2005 | Himmelstoss | H01Q 1/3233 | 343/700 MS |
| 2005/0200531 A1 * | 9/2005 | Huang | H01Q 19/026 | 343/700 MS |
| 2005/0206576 A1 * | 9/2005 | Gloria | H01Q 1/48 | 343/800 |
| 2007/0152881 A1 * | 7/2007 | Chan | H01Q 1/243 | 343/700 MS |
| 2007/0205955 A1 * | 9/2007 | Korisch | H01Q 1/246 | 343/853 |
| 2009/0046019 A1 * | 2/2009 | Sato | H01Q 3/44 | 343/702 |
| 2009/0212990 A1 * | 8/2009 | Cloutier | G01S 13/32 | 342/22 |
| 2009/0227882 A1 * | 9/2009 | Foo | A61B 5/0205 | 600/508 |
| 2009/0237321 A1 * | 9/2009 | Lin | H01Q 1/246 | 343/893 |
| 2011/0109524 A1 * | 5/2011 | Saily | H01Q 21/08 | 343/893 |
| 2011/0274146 A1 * | 11/2011 | Huang | H01Q 1/38 | 375/219 |
| 2013/0293427 A1 * | 11/2013 | Zhang | H01Q 19/28 | 343/702 |
| 2014/0368373 A1 * | 12/2014 | Crain | G01S 5/02 | 342/5 |
| 2015/0102971 A1 * | 4/2015 | Liu | H01Q 21/26 | 343/798 |
| 2015/0162664 A1 * | 6/2015 | Kawata | H01Q 1/38 | 343/749 |
| 2015/0301167 A1 * | 10/2015 | Sentelle | A61B 5/0205 | 342/22 |
| 2016/0146925 A1 * | 5/2016 | Millar | G01S 7/352 | 342/113 |
| 2017/0040711 A1 * | 2/2017 | Rakib | H01Q 1/246 | |
| 2017/0317418 A1 * | 11/2017 | Garcia | H01Q 9/0407 | |

* cited by examiner

ANTENNA ARRAY

CROSS REFERENCE TO RELATED APPLICATIONS

This Application claims priority of Taiwan Patent Application No. 104123193, filed on Jul. 17, 2015, the entirety of which is incorporated by reference herein.

BACKGROUND OF THE INVENTION

Field of the Invention

The present invention relates to an antenna array, and in particular to an antenna array utilized in detection.

Description of the Related Art

Antenna technology is commonly utilized in the field of biomonitoring to help provide nursing aid the elderly persons, children, patients, and animals. For example, antenna technology may be utilized to remotely monitor whether an elderly person has fallen down, moves, or experiences potentially dangerous irregularities of breathing or heart rate. However, it is important that the signal used by the biomonitoring antenna device does not interfere with the signals of other electronic devices (the waveband of the signal of the biomonitoring antenna device cannot overlap with the waveband of the signal of other electronic devices). Therefore, conventional biomonitoring antenna devices use a narrow bandwidth, which can lead to inefficiency.

BRIEF SUMMARY OF THE INVENTION

An antenna array is provided for monitoring an object. The antenna array includes an emitting antenna module, a first receiving antenna module, a second receiving antenna module and a third receiving antenna module. The emitting antenna module emits a detecting signal, wherein the detecting signal contacts the object, and is reflected by the object as a return signal. The first receiving antenna module receives the return signal. The second receiving antenna module receives the return signal. The third receiving antenna module receives the return signal, wherein any one of the antenna modules has a phase difference of 90 degrees with the nearest neighboring antenna module.

In one embodiment, a distance is formed between any one of the antenna modules and the nearest neighboring antenna module, and the distance is greater than the wavelength of the detecting signal.

In one embodiment, the first receiving antenna module, the second receiving antenna module and the third receiving antenna module are arranged in a triangle.

In one embodiment, the emitting antenna module is located between the first receiving antenna module and the second receiving antenna module.

In one embodiment, the emitting antenna module, the first receiving antenna module, the second receiving antenna module and the third receiving antenna module are the antenna module of the same structure.

In one embodiment, the emitting antenna module comprises a substrate, a ground element, a feed point, a first radiation element and a second radiation element. A first slot and a second slot are formed on the ground element. At least a portion of the first radiator extends into the first slot, and at least a portion of the second radiator extends into the second slot. The feed point couples the first radiator with the second radiator.

In one embodiment, the first radiator and the second radiator are fishbone shaped.

In one embodiment, the shape of the first radiator differs from the shape of the second radiator.

In one embodiment, the shape of the first slot differs from the shape of the second slot.

In one embodiment, the first radiator comprises a first extending portion, a first branch, a second branch and a third branch, wherein the first branch, the second branch and the third branch are parallel to each other, an end of the first extending portion is connected to the feed point, the other end of the first extending portion is connected to the first branch, and the second branch and the third branch are located between the feed point and the first branch and are connected to the first extending portion.

In one embodiment, the first branch is located outside of the first slot, and the second branch and the third branch are located in the first slot.

In one embodiment, the second radiator comprises a second extending portion, a fourth branch, a fifth branch, a sixth branch and a seventh branch, wherein the fourth branch, the fifth branch, the sixth branch and the seventh branch are parallel to each other, an end of the second extending portion is connected to the feed point, the other end of the second extending portion is connected to the seventh branch, and the fourth branch, the fifth branch and the sixth branch are located between the feed point and the seventh branch and are connected to the second extending portion.

In one embodiment, the seventh branch is located outside of the second slot, and the fourth branch, the fifth branch and the sixth branch are located in the second slot.

In one embodiment, the extending direction of the first extending portion is opposite to the extending direction of the second extending portion.

In one embodiment, the width of the first branch is greater than the width of the seventh branch.

In one embodiment, the length of the fifth branch is greater than the length of the fourth branch, and the length of the fifth branch is greater than the length of the sixth branch.

Utilizing the antenna module of the embodiment of the invention, the first radiator and the second radiator are fishbone shaped, and the first radiator is asymmetric to the second radiator. Therefore, the resonance frequency band is generated with limited space, and the bandwidth is increased. Additionally, the first slot, the second slot and the fishbone shaped structure improve the directionality and concentration of the antenna module.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
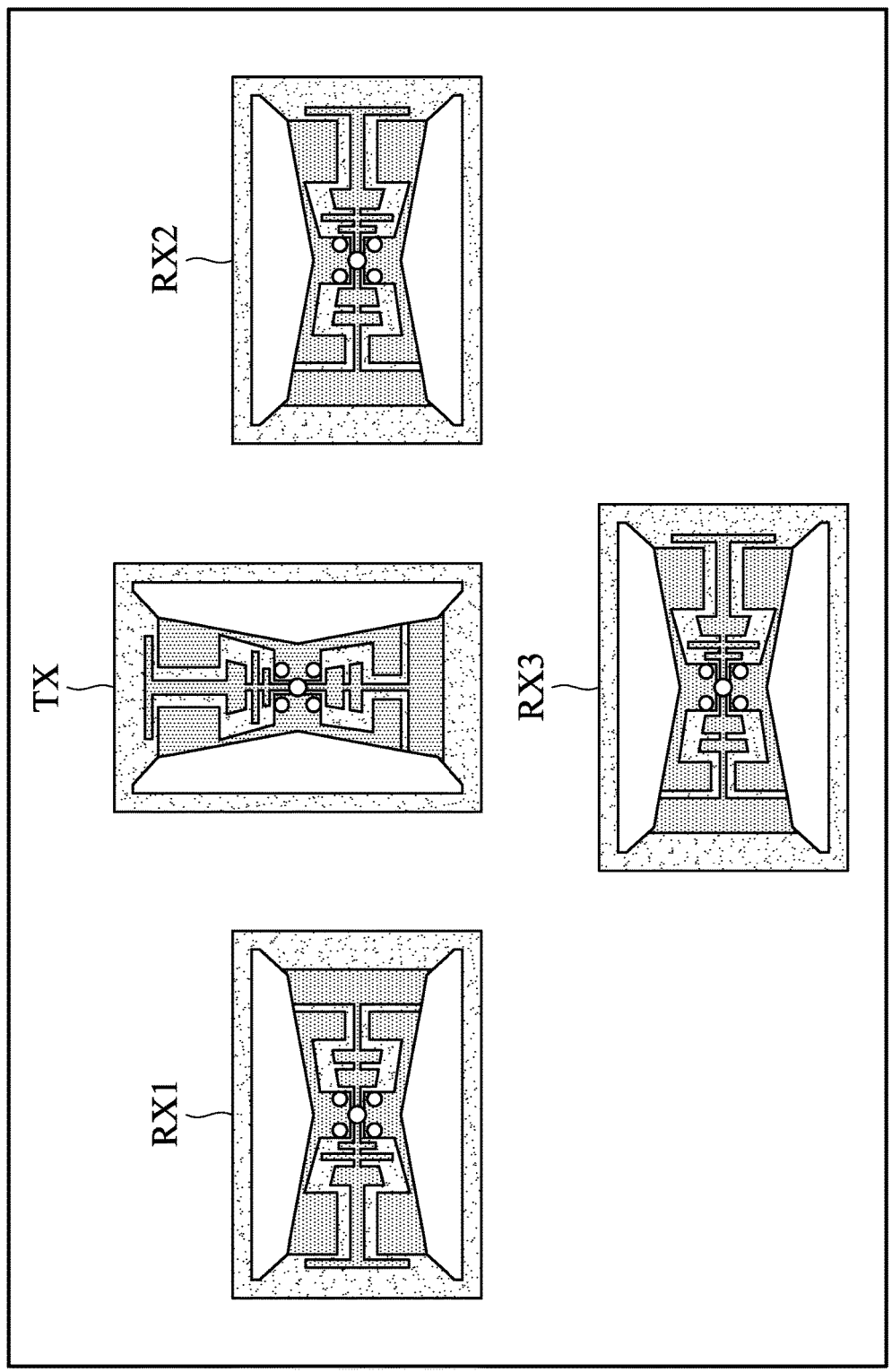
FIG. 1A shows an antenna array of an embodiment of the invention.

FIG. 1A shows an antenna array of an embodiment of the invention, which is utilized to monitor an object (such as an elderly person, a child, a patient, or an animal). The antenna array 1 includes an emitting antenna module TX, a first receiving antenna module RX1, a second receiving antenna module RX2 and a third receiving antenna module RX3. The emitting antenna module TX emits a detecting signal, wherein the detecting signal contacts the object, and is reflected by the object as a return signal. The first receiving antenna module RX1 receives the return signal and outputs a first result signal. The second receiving antenna module RX2 receives the return signal and outputs a second result signal. The third receiving antenna module RX3 receives the return signal and outputs a third result signal. In one embodiment, the first receiving antenna module RX1, the second receiving antenna module RX2 and the third receiving antenna module RX3 are coupled to a processor. The processor analyzes the movement, physiological conditions or other information about the object according to the first, second and third result signals provided by the first receiving antenna module RX1, the second receiving antenna module RX2 and the third receiving antenna module RX3.

With reference to FIG. 1A, in this embodiment, any one of the antenna modules has a phase difference of 90 degrees with the nearest neighboring antenna module. Specifically, in this embodiment, the emitting antenna module TX has a phase difference of 90 degrees with the first receiving antenna module RX1, the emitting antenna module TX has a phase difference of 90 degrees with the second receiving antenna module RX2, and the emitting antenna module TX has a phase difference of 90 degrees with the third receiving antenna module RX3.

In this embodiment, the first receiving antenna module RX1, the second receiving antenna module RX2 and the third receiving antenna module RX3 are arranged in a triangle. The emitting antenna module TX is located between the first receiving antenna module RX1 and the second receiving antenna module RX2.

In one embodiment, a distance is formed between any one of the antenna modules and the nearest neighboring antenna module, and the distance is greater than the wavelength $\lambda$ of the detecting signal. For example, a distance is formed between the emitting antenna module TX and the first receiving antenna module RX1, and the distance is greater than the wavelength $\lambda$ of the detecting signal, a distance is formed between the emitting antenna module TX and the second receiving antenna module RX2, and the distance is greater than the wavelength $\lambda$ of the detecting signal, and a distance is formed between the emitting antenna module TX and the third receiving antenna module RX3, and the distance is greater than the wavelength $\lambda$ of the detecting signal.

Figure 2:
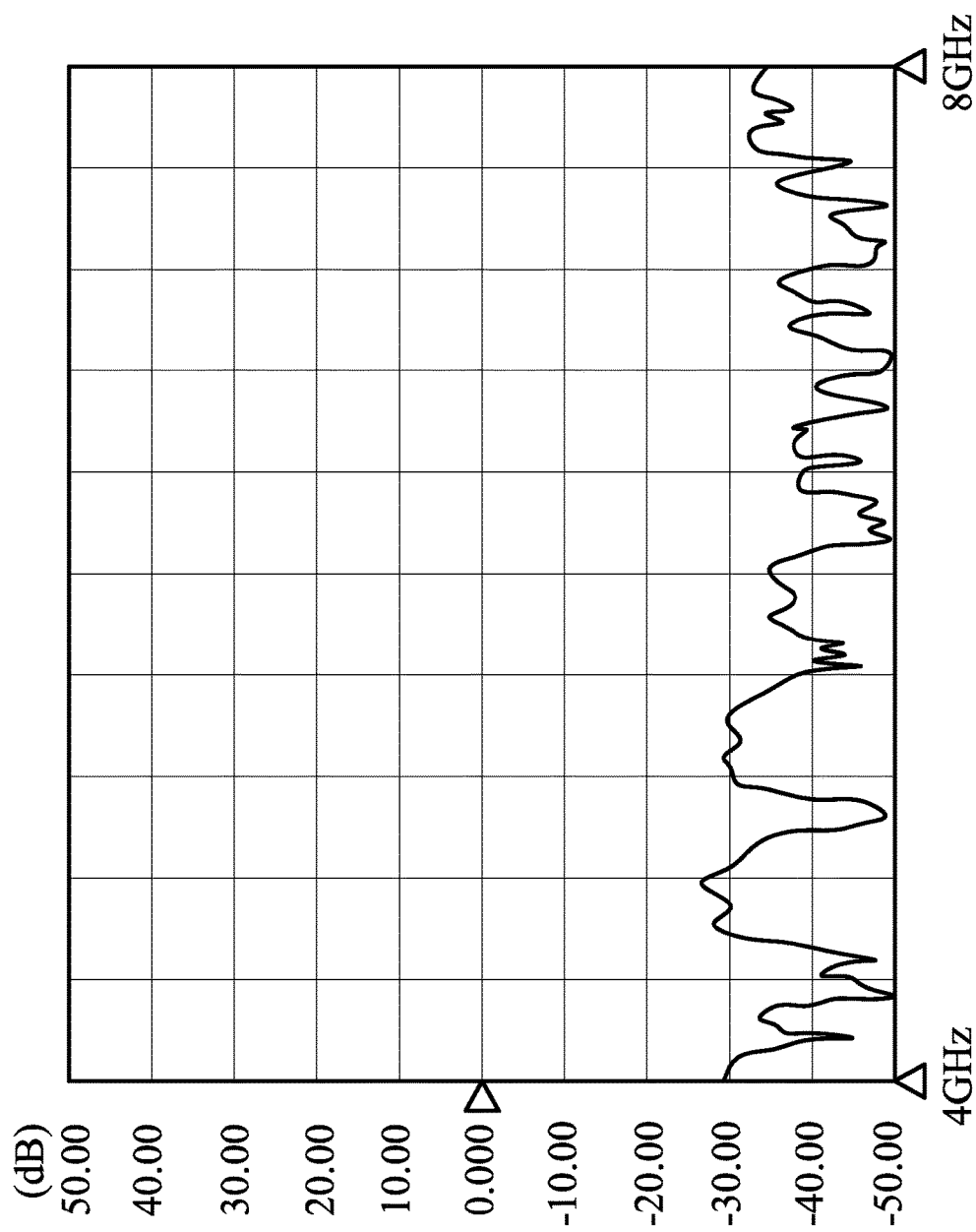
FIG. 2 shows the signal insulation of the antenna array of the embodiment of the invention.

Utilizing the antenna array of the embodiment of the invention, any one of the antenna modules has the phase difference of 90 degrees with the nearest neighboring antenna module. Therefore, the signal insulation and the transmission efficiency of the antenna array are improved. With reference to FIG. 2, in one embodiment, the signal insulation (S21) of the antenna array can lower than −30 dB. In the band between 5 GHz-6 GHz, the transmission efficiency of the antenna array is between 55% and 80%.

Figure 1B:
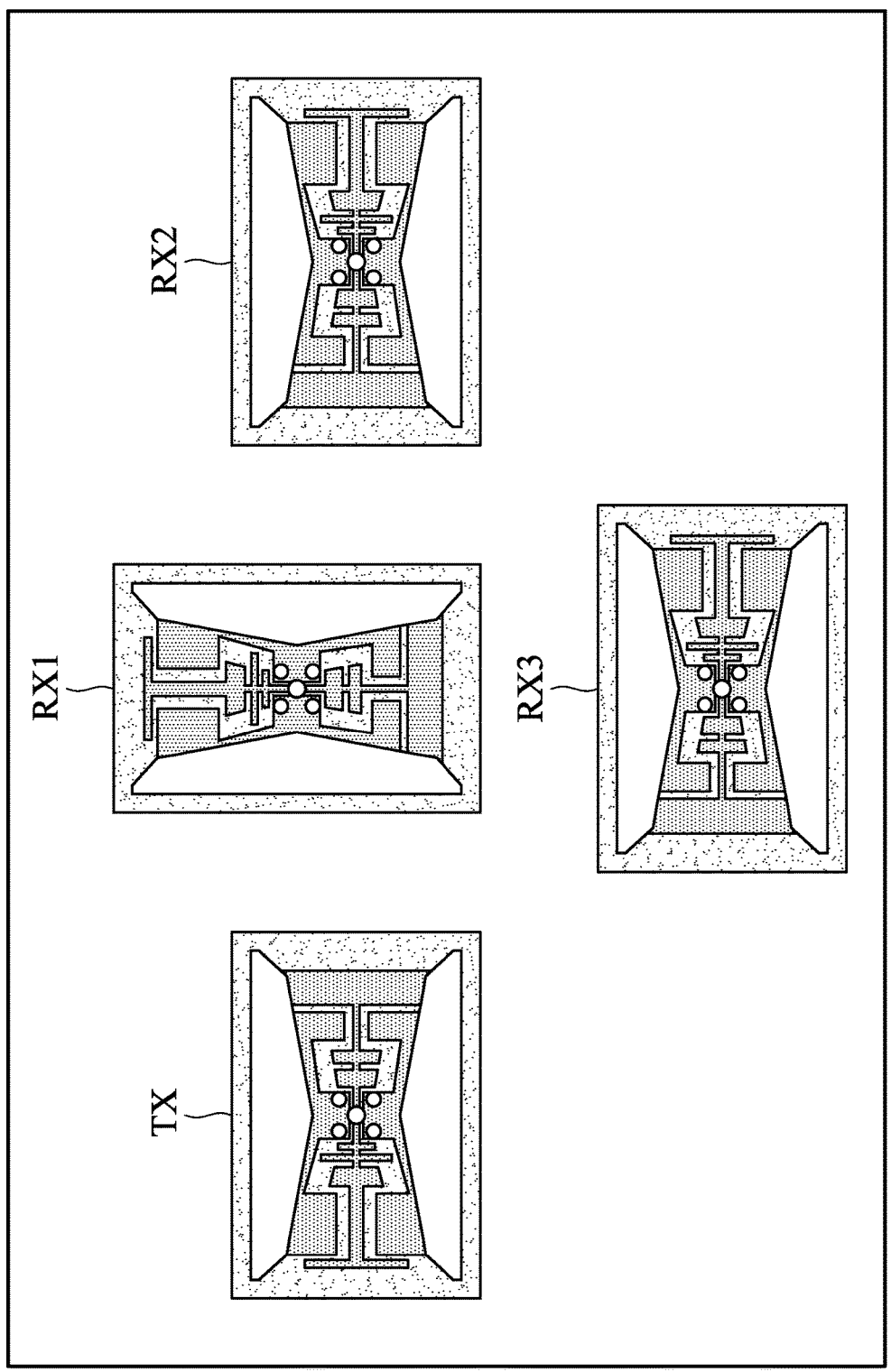
FIG. 1B shows an antenna array of another embodiment of the invention.

FIG. 1B shows an antenna array 1' of another embodiment of the invention, wherein the positions of the emitting antenna module TX, the first receiving antenna module RX1, the second receiving antenna module RX2 and the third receiving antenna module RX3 can be modified, and the antenna array 1' still satisfies the rule that any one of the antenna modules must have a phase difference of 90 degrees with the nearest neighboring antenna module, and the rule that the distance formed between any one of the antenna modules and the nearest neighboring antenna module must be greater than the wavelength $\lambda$ of the detecting signal.

Figure 3:
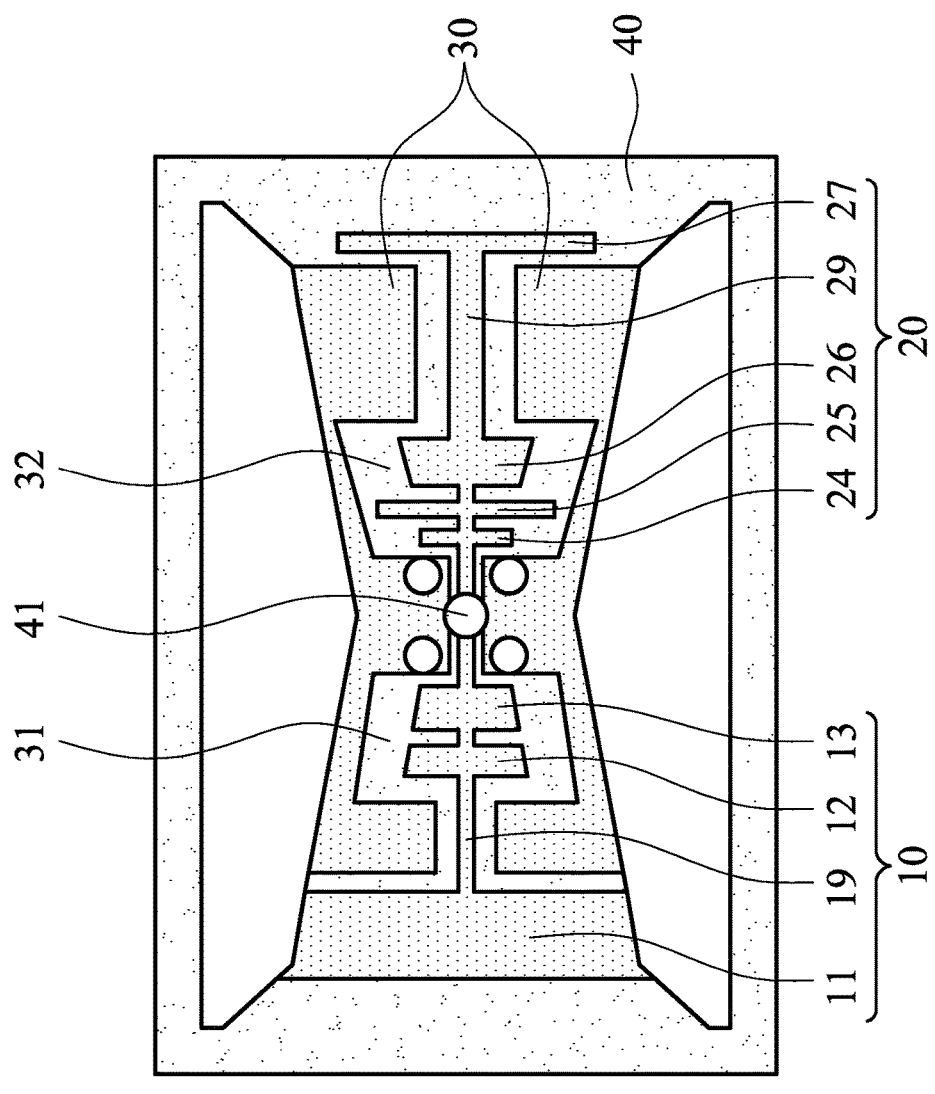
FIG. 3 shows an antenna module of an embodiment of the invention.

In one embodiment, the emitting antenna module TX, the first receiving antenna module RX1, the second receiving antenna module RX2 and the third receiving antenna module RX3 are designed by dipole antenna structure and slot antenna structure. The emitting antenna module TX, the first receiving antenna module RX1, the second receiving antenna module RX2 and the third receiving antenna module RX3 are the antenna module of the same structure. With reference to FIG. 3, the detailed structure of the antenna module of the embodiment of the invention is described with emitting antenna module TX as an example. The emitting antenna module TX comprises a substrate 40, a ground element 30, a feed point 41, a first radiation element 10 and a second radiation element 20. A first slot 31 and a second slot 32 are formed on the ground element 30. At least a portion of the first radiator 10 extends into the first slot 31. At least a portion of the second radiator 20 extends into the second slot 32, and the feed point 41 couples the first radiator 10 with the second radiator 20.

As to the detailed structure, the first radiator 10 and the second radiator 20 are fishbone shaped. In this embodiment, the shape the first radiator 10 differs from the shape of the second radiator 20. The shape of the first slot 31 differs from the shape of the second slot 32.

The first radiator 10 comprises a first extending portion 19, a first branch 11, a second branch 12 and a third branch 13. The first branch 11, the second branch 12 and the third branch 13 are parallel to each other. An end of the first extending portion 19 is connected to the feed point 41. The other end of the first extending portion 19 is connected to the first branch 11. The second branch 12 and the third branch 13 are located between the feed point 41 and the first branch 11 and are connected to the first extending portion 19. In one embodiment, the first branch 11 is located outside of the first slot 31, and the second branch 12 and the third branch 13 are located in the first slot 31.

The second radiator 20 comprises a second extending portion 29, a fourth branch 24, a fifth branch 25, a sixth branch 26 and a seventh branch 27. The fourth branch 24, the fifth branch 25, the sixth branch 26 and the seventh branch 27 are parallel to each other. An end of the second extending portion 29 is connected to the feed point 41. The other end of the second extending portion 29 is connected to the seventh branch 27. The fourth branch 24, the fifth branch 25 and the sixth branch 26 are located between the feed point 41 and the seventh branch 27 and are connected to the second extending portion 29. In one embodiment, the seventh branch 27 is located outside of the second slot 32, and the fourth branch 24, the fifth branch 25 and the sixth branch 26 are located in the second slot 32.

In one embodiment, the extending direction of the first extending portion 19 is opposite to the extending direction of the second extending portion 29. The width of the first branch 11 is greater than the width of the seventh branch 27. The length of the fifth branch 25 is greater than the length of the fourth branch 24, and the length of the fifth branch 25 is greater than the length of the sixth branch 26.

In this embodiment, the first slot 31 and the second slot 32 are T shaped. In one embodiment, the first slot 31 and the first branch 11 transmit the 5 GHz signals. The second slot 32 and the seventh branch 27 transmit the 6 GHz signals. The second branch 12, the third branch 13, the fourth branch 24, the fifth branch 25 and the sixth branch 26 transmit the signals within the band of 7 GHZ-8 GHz. The second branch 12 and the third branch 13 enhance the transmission of the 8 GHz signals. The fourth branch 24, the fifth branch 25 and the sixth branch 26 enhance the transmission of the 7 GHz signals.

Utilizing the antenna module of the embodiment of the invention, the first radiator and the second radiator are fishbone shaped, and the first radiator is asymmetric to the second radiator. Therefore, the resonance frequency band is generated with limited space, and the bandwidth is increased. Additionally, the first slot, the second slot and the fishbone shaped structure improve the directionality and concentration of the antenna module. In one embodiment, the second branch 12, the third branch 13, the fourth branch 24, the fifth branch 25 and the sixth branch 26 are slightly trapezoid shaped. The first slot 31 and the second slot 32 are also trapezoid shaped to improve the directionality and concentration of the antenna module.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna array, for monitoring an object, comprising:
   an emitting antenna module, emitting a detecting signal, wherein the detecting signal contacts the object, and is reflected by the object as a return signal;
   a first receiving antenna module, to receive the return signal;
   a second receiving antenna module, to receive the return signal; and
   a third receiving antenna module, to receive the return signal, wherein a structural difference between each of the antenna module and the nearest neighboring antenna module is arranged orthogonally.

2. The antenna array as claimed in claim 1, wherein a distance is formed between each of the antenna modules and the nearest neighboring antenna module, and the distance is greater than a wavelength of the detecting signal.

3. The antenna array as claimed in claim 2, wherein the first receiving antenna module, the second receiving antenna module and the third receiving antenna module are arranged in a triangle.

4. The antenna array as claimed in claim 3, wherein the emitting antenna module is located between the first receiving antenna module and the second receiving antenna module.

5. The antenna array as claimed in claim 1, wherein the emitting antenna module, the first receiving antenna module, the second receiving antenna module and the third receiving antenna module are the antenna modules of the same structure.

6. The antenna array as claimed in claim 5, wherein the emitting antenna module comprises a substrate, a ground element, a feed point, a first radiator and a second radiator; a first slot and a second slot are formed on the ground element, at least a portion of the first radiator extends into the first slot, at least a portion of the second radiator extends into the second slot, and the feed point couples the first radiator with the second radiator.

7. The antenna array as claimed in claim 6, wherein the first radiator and the second radiator are fishbone shaped.

8. The antenna array as claimed in claim 7, wherein the shape of the first radiator differs from the shape of the second radiator.

9. The antenna array as claimed in claim 8, wherein the shape of the first slot differs from the shape of the second slot.

10. The antenna array as claimed in claim 9, wherein the first radiator comprises a first extending portion, a first branch, a second branch and a third branch, wherein the first branch, the second branch and the third branch are parallel to each other, an end of the first extending portion is connected to the feed point, the other end of the first extending portion is connected to the first branch, and the second branch and the third branch are located between the feed point and the first branch and are connected to the first extending portion.

11. The antenna array as claimed in claim 10, wherein the first branch is located outside of the first slot, and the second branch and the third branch are located in the first slot.

12. The antenna array as claimed in claim 11, wherein the second radiator comprises a second extending portion, a fourth branch, a fifth branch, a sixth branch and a seventh branch, wherein the fourth branch, the fifth branch, the sixth branch and the seventh branch are parallel to each other, an end of the second extending portion is connected to the feed point, the other end of the second extending portion is connected to the seventh branch, and the fourth branch, the fifth branch and the sixth branch are located between the feed point and the seventh branch and are connected to the second extending portion.

13. The antenna array as claimed in claim 12, wherein the seventh branch is located outside of the second slot, and the fourth branch, the fifth branch and the sixth branch are located in the second slot.

14. The antenna array as claimed in claim 13, wherein an extending direction of the first extending portion is opposite to an extending direction of the second extending portion.

15. The antenna array as claimed in claim 14, wherein a width of the first branch is greater than a width of the seventh branch.

16. The antenna array as claimed in claim 15, wherein a length of the fifth branch is greater than a length of the fourth branch, and the length of the fifth branch is greater than a length of the sixth branch.

* * * * *